United States Patent [19]
Allport et al.

[11] 3,901,959
[45] Aug. 26, 1975

[54] POLYMERIC MATERIALS
[75] Inventors: Dennis Charlton Allport; Graham Briggs, both of Manchester, England
[73] Assignee: Imperial Chemical Industries Limited, London, England
[22] Filed: Jan. 14, 1974
[21] Appl. No.: 433,404

[30] Foreign Application Priority Data
Jan. 19, 1973 United Kingdom............ 2788/73

[52] U.S. Cl....... 264/51; 260/2.5 AM; 260/2.5 AN; 260/2.5 AZ; 260/2.5 BD; 264/45.5
[51] Int. Cl.² ............... B29G 7/02; C08G 18/10; C08G 18/32; C08G 18/66
[58] Field of Search... 260/2.5 AN, 2.5 AP, 2.5 AT, 260/2.5 AZ, 2.5 BD, 2.5 AM; 264/51, 45.5

[56] References Cited
UNITED STATES PATENTS

| | | | |
|---|---|---|---|
| 3,186,971 | 1/1965 | Hostettler | 260/2.5 AN |
| 3,591,532 | 7/1971 | Abercrombie | 260/2.5 AN |
| 3,591,561 | 7/1971 | Kazama | 260/2.5 AN |
| 3,661,811 | 5/1972 | Hardy | 260/2.5 AN |
| 3,666,724 | 5/1972 | Hostettler | 260/2.5 AN |
| 3,674,721 | 7/1972 | Aufdermarsh | 260/2.5 AT |
| 3,853,795 | 12/1974 | Jenkins | 260/2.5 BD |
| 3,856,716 | 12/1974 | Jenkins | 260/2.5 AN |

Primary Examiner—M. J. Welsh
Assistant Examiner—C. Warren Ivy
Attorney, Agent, or Firm—Cushman, Darby & Cushman

[57] ABSTRACT

A process for the manufacture of cellular polyurethanes which comprises intimately mixing:
a. a prepolymer prepared by the reaction of a polyester polyol with an excess of a polyisocyanate comprising diphenylmethane diisocyanate, and
b. a mixture containing a polyether polyol, blowing agent, catalyst and surface active agent, the ratio of isocyanate groups in component (a) to active hydrogen atoms in component (b) being substantially within the range of 0.95:1 to 1.2:1.

1 Claim, No Drawings

POLYMERIC MATERIALS

This invention relates to polymeric materials and more particularly to a process for the manufacture of cellular polyurethanes.

According to the invention there is provided a process for the manufacture of cellular polyurethane which comprises intimately mixing:

a. a prepolymer prepared by the reaction of a polyester polyol with an excess of a polyisocyanate comprising diphenylmethane diisocyanate, and b. a mixture containing a polyether polyol, blowing agent, catalyst and surface active agent, the ratio of isocyanate groups in component (a) to active hydrogen atoms in component (b) being substantially within the range of 0.95:1 to 1.2:1.

The prepolymer, referred to above as component (a) may be prepared using the conditions that have been described in the prior art for such preparations. Thus, the polyisocyanate and the polyester polyol may be reacted together at normal or elevated temperatures, optionally in the presence of a catalyst, until the reaction is substantially complete. It is generally preferred to form the prepolymer by reacting the polyisocyanate with the polyester polyol at a temperature within the range 60°–120°C. The polyisocyanate is used in an excess amount relative to the polyester polyol, that is to say the ratio of isocyanate groups in the polyisocyanate to active hydrogen atoms (present in hydroxyl and carboxyl groups) in the polyester polyol is greater than 1.0:1. Preferably this ratio should be at least 4:1 so that the viscosity of the prepolymer is not excessively high. Suitably, the prepolymer has an NCO content of 15–21%.

The polyisocyanate used in preparing the prepolymer comprises diphenylmethane diisocyanate. Accordingly, useful polyisocyanates include pure 4,4'-diphenylmethane diisocyanate as well as mixtures of the latter isomer with the corresponding 2,4'-isomer. Mixtures of the 4,4'- and 2,4'-isomers containing up to 10% of the 2,4'-isomer are commercially available. Also useful are the so-called crude diphenylmethane diisocyanate compositions, particularly those containing from 30% to 90%, preferably from 40% to 80%, by weight of diphenylmethane diisocyanates, the remainder being largely polymethylene polyphenyl polyisocyanates of functionality greater than two. Such compositions may be obtained by the phosgenation of crude diaminodiphenylmethane as has been fully described in the prior art.

Polyester polyols suitable for use in preparing the prepolymer have been fully described in the prior art relating to cellular polyurethanes. Such polyesters may be made from polycarboxylic acids and polyhydric alcohols. Suitable polycarboxylic acids include succinic, glutaric, adipic, sebacic, phthalic, isophthalic, terephthalic and trimesic acids. Mixtures of acids may be used. Examples of polyhydric alcohols include ethylene glycol, propylene glycol, tetramethylene glycol, diethylene glycol, decamethylene glycol, glycerol, trimethylolpropane and pentaerythritol.

Particularly suitable polyester polyols for use in making the prepolymers have from 2 to 4 hydroxyl groups per molecule and hydroxyl numbers of from 21 to 224, preferably from 30 to 120 and especially from 50 to 60.

Component (b) used in the process of the invention is a mixture containing a polyether polyol and any blowing agents, catalysts and surface active agents required for the production of a cellular polyurethane. If desired, the mixture may contain other conventional ingredients of polyurethane foam-forming reaction mixtures other than a polyisocyanate. Conveniently, the mixture contains all the ingredients of the foam-forming reaction mixture except the polyisocyanate and polyester polyol. Examples of other ingredients which may be present in the mixture include flame-retardants, for example tris chloropropyl phosphate, pigments, fillers and low molecular weight cross-linking or chainextending agents such as ethylene glycol, 1,4-butanediol, glycerol and phenylene diamine.

Polyether polyols which may be present in component (b) may be prepared by the reaction of one or more alkylene oxides with a compound containing a plurality of active hydrogen atoms. Suitable alkylene oxides include ethylene oxide, epichlorohydrin, 1,2-propylene oxide, 1,2-butylene oxide, 2,3-butylene oxide and styrene oxide. Mixtures of two or more oxides may be used if desired, for example mixtures of ethylene and propylene oxides, or, as a further variant, the active hydrogen-containing compound may be reacted with two or more alkylene oxides in successive stages, for example using propylene oxide in the first stage and ethylene oxide in the second or, conversely, ethylene oxide in the first stage and propylene oxide in the second. Compounds containing a plurality of active hydrogen atoms with which the alkylene oxides may be reacted include water, ammonia, hydrazine, cyanuric acid, phosphorous, phosphoric or phosphonic acids, polyhydroxy compounds, for example ethylene glycol, propylene glycol, diethylene glycol, glycerol, trimethylolpropane, triethanolamine, pentaerythritol, sorbitol, sucrose, phenolformaldehyde reaction products, resorcinol and phloroglucinol, aminoalcohols, for example monoethanolamine and diethanolamine, polyamines, for example ethylene diamine, hexamethylene diamine, tolylene diamines and diaminodiphenylmethanes and polycarboxylic acids, for example adipic acid, terephthalic acid and trimesic acid. The conditions for the reaction between the alkylene oxide and the active hydrogen containing compound may be those fully described in the prior art using, for example, basic catalysts such as potassium hydroxide or acidic catalysts such as boron trifluoride. The reaction products may have molecular weights of up to 10,000 according to the amount of alkylene oxide reacted with the active hydrogen-containing compound.

Particularly suitable polyether polyols for use in the process of the invention are polyoxypropylene and poly(oxypropylene-oxyethylene)polyols having from two to four hydroxyl groups per molecule and hydroxyl numbers of from 21 to 224, preferably from 25 to 112 and especially from 30 to 60.

Blowing agents which may be present in component (b) have been fully described in polyurethane foam literature. They include water which reacts with isocyanate groups in the prepolymer to form carbon dioxide and inert volatile liquid blowing agents. The latter blowing agents suitably have boiling points not exceeding 100°C at atmospheric pressure and preferably not exceeding 50°C. Examples of such liquids are halogenated hydrocarbons such as methylene chloride, vinylidene chloride, and particularly fluorinated hydrocarbons such as trichloromonofluoromethane, dichlorodifluoromethane, monochlorodifluoromethane, dichlorotetrafluoroethane and 1,1,2-trichloro-1,2,2-trifluoroethane. Mixtures of these low boiling-point liquids one with another and/or with other substituted or unsubstituted hydrocarbons may also be used. The amount of blowing agent is selected in known manner to provide cellular polyurethanes of the desired density under the particular foaming conditions being used.

Catalysts which may be used in the process of the invention have been fully described in the prior art relating to polyurethanes and include tertiary amines and organic metal compounds, particularly tin compounds. Examples of suitable tertiary amines include trimethylamine, triethylamine, dimethylethanolamine, N,N,N',N'-tetramethyl-1,3-butanediamine, N,N-dimethylcyclohexylamine, N,N-dimethylbenzylamine, N,N-dimethylphenylethylamine, N-methylpyrrolidine, N-methylmorpholine, N-ethylmorpholine, N-methylpiperidine, N,N'-dimethylpiperazine and 1,4-diazabicyclo[2.2.2] octane. Organic metal compounds which may be used as catalysts include dibutyltin dilaurate and stannous octoate. It is often advantageous to use a catalyst combination of a tertiary amine and a tin compound, for example 1,4-diazabicyclo[2.2.2] octane and dibutyltin dilaurate.

Surface active agents which may be used in the process of the invention have been fully described in the prior art relating to polyurethanes and include siloxane-oxyalkylene copolymers and ethylene oxide/propylene oxide block copolymers.

Component (b) should be a mobile liquid which mixes readily with component (a). The two components may be mixed together in any convenient manner using, for example, mixing means already described in the prior art.

The process of the invention is particularly suitable for the preparation of cellular polyurethane elastomers having densities in the range 0.1 – 1.0 g/cc. Such materials are useful as soles for shoes and may advantageously be prepared by the reaction of (a) a prepolymer derived from substantially pure 4,4'-diphenylmethane diisocyanate and a linear or slightly branched polyester polyol having a hydroxyl number within the range 30 to 120 with (b) a pre-formed mixture containing a polyoxypropylene or poly(oxyethylene-oxypropylene) diol or triol having a hydroxyl number within the range 25 – 112, a glycol chain-extender, one or more catalysts, a surface active agent and sufficient blowing agent to give a product of the desired density under the foaming conditions being used.

It is often advantageous to prepare the aforesaid cellular polyurethane elastomers by foaming components (a) and (b) in a closed mould having a volume less than that which would be occupied by the resultant foam if the reaction mixture were allowed to rise freely. Such overpacking techniques have been fully described in the prior art. The desired amount of reaction mixture is introduced into a mould which is then closed. A suitable degree of overpacking may be achieved by introducing into the mould an amount of reaction mixture which, if allowed to rise freely, would produce a foam having a volume at least 1.1 times the volume of the mould. Preferably, the amount of reaction mixture should be such that, if allowed to rise freely, would produce a foam having a volume from 1.5 to 10 times the volume of the mould. For the production of shoe soles, the foam-forming components are introduced into moulds corresponding in size and shape with the desired products. For this purpose, products having densities in the range 0.5 – 0.7 g/cc are most suitable.

The process of the invention has the advantage of greater ease of handling and processing compared with processes based wholly on polyesters. This is because polyesters, in general, are solids or slowly crystallising viscous liquids whereas polyethers, in general, are liquids of lower viscosity.

The invention is illustrated but not limited by the following Examples in which all parts and percentages are by weight.

EXAMPLE 1

A prepolymer having an NCO content of 18.1% is prepared by reacting 61.3 parts of 4,4'-diphenylmethane diisocyanate with 42.9 parts of poly(ethylene/propylene adipate) for 2 hours at 80°C. The poly(ethylene/propylene adipate) has a hydroxyl value of 56 mg KoH/g, an acid value less than 2 mg KoH/g and is prepared by reacting 467 parts of adipic acid with 154 parts of ethylene glycol and 81 parts of propylene glycol.

104.2 Parts of the prepolymer are mixed with 87.1 parts of a pre-formed blend consisting of:

| | |
|---|---|
| poly(oxyethylene-oxypropylene)triol | 70.0 parts |
| 1,4-butanediol | 15.3 parts |
| 1,4-diazabicyclo[2.2.2]octane | 0.2 part |
| dibutyltin dilaurate | 0.1 part |
| siloxane-oxyalkylene copolymer (Silicone L5340) | 1.0 part |
| water | 0.5 part. |

The poly(oxyethylene-oxypropylene) triol is made by reacting glycerol with propylene oxide to form a polyoxypropylene triol which is then reacted with ethylene oxide. The final product has an oxyethylene content of 13%, a hydroxyl value of 32 mg KoH/g and 75% of the hydroxyl groups are primary hydroxyls.

The cellular polyurethane product has a density of 0.4 g/cc (free rise).

Silicone L5340 is a clear liquid silicone surfactant sold for rigid urethane foam systems having a specific gravity of 1.053 at 25°C and a viscosity at 25°C of 1,000 centistokes.

EXAMPLE 2

A prepolymer having an NCO content of 16.1% is prepared by reacting 103 parts of 4,4'-diphenylmethane diisocyanate with 87.1 parts of poly(ethylene tetramethylene adipate) for 2 hours at 80°C. The poly(ethylene tetramethylene adipate) has a hydroxyl value of 56.0 mg KOH g$^{-1}$, an acid value less than 2.0 mg KOH g$^{-1}$ and is prepared by reacting 823 parts of adipic acid with 205 parts of ethylene glycol and 292 parts of 1,4-butane diol.

100 parts of the prepolymer at 40°C are mixed with 65 parts of a blend at 22°C preformed from:

| | |
|---|---|
| poly(oxyethylene-oxypropylene)triol (as described in Example 1) | 496.1 parts |
| 1,4-butane diol | 138.9 parts |
| 1,4-diazabicyclo[2.2.2]octane | 1.7 parts |
| dibutyltin dilaurate | 0.8 part |
| siloxane-oxyalkylene copolymer (Silicone L5340) | 8.2 parts |
| water | 4.0 parts. |

The cellular polyurethane product has the charcteristics given in the Table below.

EXAMPLE 3

A prepolymer having an NCO content of 17.8% is prepared by reacting 103 parts of 4,4'-diphenylmethane diisocyanate with 70.3 parts of poly(ethylene tetramethylene adipate) for 2 hours at 80°C. The poly(ethylene tetramethylene adipate) is as described in Example 2.

110 parts of the prepolymer at 40°C are mixed with 91.8 parts of a blend at 22°C preformed from:

| | |
|---|---|
| poly(oxyethylene-oxypropylene)triol (as described in Example 1) | 339.3 parts |
| Pluronic L44 (Wyandotte Chemicals) | 339.3 parts |
| 1,4-butane diol | 161.4 parts |
| 1,4-diazabicyclo[2.2.2]octane | 1.9 parts |
| dibutyltin dilaurate | 0.9 part |
| siloxane-oxyalkylene copolymer (Silicone L5340) | 9.4 parts |
| water | 2.0 parts |
| Trichlorofluoromethane | 64.1 parts |

The Pluronic L44 (Wyandotte Chemicals) is an oxyethylated polypropylene glycol which has a hydroxyl value of 51 mg KOH g$^{-1}$, a polypropylene glycol molecular weight of 1200 and a polyoxyethylene content of 40%.

The cellular polyurethane product has the characteristics given in the Table below.

EXAMPLE 4

95 parts of the prepolymer described in Example 3 at 40°C are mixed with 85 parts of a blend at 22°C preformed from:

| | |
|---|---|
| poly(oxyethylene-oxypropylene)triol | 460.1 parts |
| Pluronic L72 (Wyandotte Chemicals) | 230.1 parts |
| 1,4-butane diol | 150.9 parts |
| 1,4-diazabicyclo[2.2.2]octane | 1.9 parts |
| dibutyltin dilaurate | 0.9 part |
| Siloxane-oxyalkylene copolymer (silicone L5340) | 9.3 parts |
| water | 4.6 parts |

The poly(oxyethylene-oxypropylene) triol is made by reacting glycerol with propylene oxide to form a polyoxypropylene triol which is then reacted with ethylene oxide. The final product has an oxyethylene content of 20%, a hydroxyl value of 32 mg KOH g$^{-1}$ and 80% of the hydroxyl groups are primary hydroxyls.

The Pluronic L72 (Wyandotte Chemicals) is an oxyethylated polypropylene glycol which has a hydroxyl value of 30 mg KOH g$^{-1}$ a polypropylene glycol molecular weight of 2050 and a polyoxyethylene content of 20%.

The cellular polyurethane product has the characteristics given in the Table below.

EXAMPLE 5

A prepolymer having an NCO content of 18.0% is prepared by reacting 103 parts of 4,4'-diphenylmethane diisocyanate with 70.3 parts of poly(diethylene adipate) for 2 hours at 80°C. The poly(diethylene adipate) has a hydroxyl value of 56.0 mg KOH g$^{-1}$, an acid value less than 2.0 mg KOH g$^{-1}$ and is prepared by reacting 438 parts of adipic acid with 358 parts of diethylene glycol.

95 parts of the prepolymer at 40°C are mixed with 85 parts of the blend described in Example 4 at 22°C.

The cellular polyurethane product has the characteristics given in the Table below.

EXAMPLE 6

A prepolymer having an NCO content of 19.9% is prepared by reacting 103 parts of 4,4'-diphenylmethane diisocyanate with 56.2 parts of poly(diethylene adipate) for 2 hours at 80°C. The poly(diethylene adipate) is as described in Example 5.

84.6 parts of the prepolymer at 40°C are mixed with 95.4 parts of a blend at 22°C pre-formed from:

| | |
|---|---|
| poly(oxyethylene-oxypropylene)triol (as described in Example 4) | 592.5 parts |
| Pluronic-L72 (Wyandotte Chemicals) | 296.3 parts |
| 1,4-butanediol | 178.4 parts |
| 1,4-diazabicyclo[2.2.2]octane | 2.1 parts |
| dibutyltin dilaurate | 1.0 part |
| siloxane-oxyalkylene copolymer (Silicone L5340) | 10.5 parts |
| water | 2.3 parts |
| trichlorofluoromethane | 70.9 parts |

The cellular polyurethane product has the characteristics given in the Table below.

EXAMPLE 7

86.5 parts of the prepolymer described in Example 6 at 40°C are mixed with 93.5 parts of a resin at 22°C preformed from:

| | |
|---|---|
| Pluronic L44 (Wyandotte Chemicals) | 838.1 parts |
| 1,4-butane diol | 155.3 parts |
| 1,4-diazabicyclo[2.2.2]octane | 1.2 parts |
| dibutyl tin dilaurate | 0.6 part |
| water | 5.0 parts |
| siloxane-oxyalkylene copolymer (Silicone L5340) | 10.1 parts |

The cellular polyurethane product has the characteristics given in the Table below.

EXAMPLE 8

A prepolymer having an NCO content of 19.6% is prepared by reacting 103 parts of 4,4'-diphenylmethane diisocyanate with 58.8 parts of poly(ethylene adipate) for 2 hours at 80°C. The poly(ethylene adipate) has a hydroxyl value of 56.0 mg. KOH g$^{-1}$, an acid value less than 2.0 mg KOH g$^{-1}$ and is prepared by reacting 835 parts of adipic acid with 390 parts of ethylene glycol.

86.5 parts of the prepolymer at 40°C are mixed with 93.5 parts of the resin blend described in Example 7.

The cellular polyurethane product has the characteristics given in the Table below.

EXAMPLE 9

90.1 parts of the prepolymer described in Example 8 at 40°C are mixed with 89.9 parts of a resin at 22°C performed from:

| | |
|---|---|
| Pluronic L64 (Wyandotte Chemicals) | 388.8 parts |
| poly(oxyethylene-oxypropylene)triol (as described in Example 4) | 388.8 parts |
| 1,4-butane diol | 163.2 parts |
| 1,4-diazabicyclo[2.2.2]octane | 2.0 parts |
| dibutyl tin dilaurate | 1.0 parts |
| water | 5.0 parts |
| siloxane-oxyalkylene copolymer Silicone L5340) | 9.8 parts |

The Pluronic L64 is an oxyethylated polypropylene glycol which has a hydroxyl value of 38.7 mg KOH/g a polypropylene glycol molecular weight of 1750 and a polyoxyethylene content of 40%.

The cellular polyurethane product has the characteristics given in the Table below.

EXAMPLE 10

A comparison with a system based wholly on polyesters is given by the following Example wherein both streams usually have to be operated at elevated temperatures, thus resulting in a decrease of cream time.

95 parts of the prepolymer described in Example 8 at 40°C are mixed with 111 parts of a blend at 55°C preformed from:

| | | |
|---|---|---|
| poly(ethylene adipate) | 929.5 | parts |
| 1,4-butane diol | 150.4 | parts |
| 1,4-diazabicyclo[2.2.2]octane | 7.6 | parts |
| siloxane-oxyalkylene copolymer (Silicone L5340) | 11.62 | parts |
| water | 3.5 | parts |

The poly(ethylene adipate) is as used in the preparation of the prepolymer.

The cellular polyurethane product has the characteristics given in the Table below.

components into a mould having a volume that is approximately half the free rise volume of the reaction mixture.

We claim:
1. A process for the manufacture of cellular polyurethanes which comprises intimately mixing:
   a. a prepolymer having an NCO content of 15–21% by weight prepared by the reaction of a polyester polyol having from two to four hydroxyl groups per molecule and a hydroxyl number of from 50 to 60 with an excess of diphenylmethane diisocyanate, and
   b. a mixture containing a polyoxypropylene or poly(-oxypropylene-oxyethylene)polyol having from two to four hydroxyl groups per molecule and a hydroxyl number of from 30 to 60, 18.5 to 28%, based on the weight of said mixture of 1,4-butanediol, a blowing agent, a catalyst and a surface active agent, the ratio of isocyanate groups in component (a) to active hydrogen atoms in component (b) being substantially within the range of 0.95:1 to 1.2:1, introducing into a closed mold a quantity of the resultant mixture sufficient to produce a cellular polyurethane whose

TABLE

PHYSICAL CHARACTERISTICS OF FOAMS PREPARED IN EXAMPLES 2–10

| Example | Cream Time (sec) | Rise Time (sec) | Tack-free Time (sec) | Free rise density g/cc | Sheet density g/cc | Sheet hardness (Shore A) |
|---|---|---|---|---|---|---|
| 2 | 14 | 30 | 25 | 0.28 | 0.61 | 82° |
| 3 | 11 | 20 | 15 | 0.20 | 0.57 | 75° |
| 4 | 11 | 25 | 16 | 0.30 | 0.59 | 75° |
| 5 | 12 | 24 | 19 | 0.27 | 0.57 | 70° |
| 6 | 11 | 24 | 19 | 0.25 | 0.63 | 80° |
| 7 | 12 | 35 | 30 | 0.30 | 0.55 | 60° |
| 8 | 12 | 35 | 30 | 0.30 | 0.60 | 65° |
| 9 | 11 | 20 | 15 | 0.30 | 0.58 | 68° |
| 10 | 5 | 35 | 22 | 0.37 | 0.60 | 75° |

The fifth column of the Table gives the density of foams made under free rise conditions. The sixth and seventh columns give the properties of cellular elastomeric sheets obtained by introducing the foam-forming volume is at least 1.1 times the volume of the mold if said quantity were allowed to react and rise freely, and foaming said mixture in said closed mold.

* * * * *